(12) United States Patent
Towler et al.

(10) Patent No.: US 6,997,213 B1
(45) Date of Patent: Feb. 14, 2006

(54) LOW COST PLATE ASSEMBLY FOR ROTARY VALVE

(75) Inventors: Gavin P. Towler, Barrington, IL (US); Anil R. Oroskar, Oakbrook, IL (US); Robert T. Sprague, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 192 days.

(21) Appl. No.: 10/742,493

(22) Filed: Dec. 19, 2003

(51) Int. Cl.
*F16K 11/074* (2006.01)
*B01D 15/00* (2006.01)

(52) U.S. Cl. ............... 137/625.46; 210/142; 210/264

(58) Field of Classification Search ........... 137/625.11, 137/625.46; 210/142, 264
See application file for complete search history.

(56) References Cited

U.S. PATENT DOCUMENTS

| | | | |
|---|---|---|---|
| 3,040,777 A | 6/1962 | Carson et al. | 137/625.15 |
| 3,192,954 A | 7/1965 | Gerhold et al. | 137/625.11 |
| 3,201,491 A | 8/1965 | Stine et al. | 260/676 |
| 3,291,726 A | 12/1966 | Broughton | 208/310 |
| 3,422,848 A | 1/1969 | Liebman et al. | 137/625.15 |
| 4,632,149 A | 12/1986 | Oroskar et al. | 137/625.15 |
| 4,705,627 A * | 11/1987 | Miwa et al. | 137/625.46 |
| 6,889,710 B1 * | 5/2005 | Wagner | 137/625.46 |

* cited by examiner

*Primary Examiner*—John Fox
(74) *Attorney, Agent, or Firm*—John G. Tolomei; Frank S. Molinard; Arthur E. Gooding

(57) ABSTRACT

A multiport rotary valve is described providing the interconnection of a plurality of conduits with a predetermined cycle. The valve uses a stack of plates defining channels and ports to form the fluid circuits.

20 Claims, 4 Drawing Sheets

LOW COST PLATE ASSEMBLY FOR ROTARY VALVE

FIELD OF THE INVENTION

The invention is related to multiport rotary valves. In particular this invention relates to valves which are capable of accomplishing the simultaneous interconnection of a plurality of conduits having a predetermined periodic sequence.

BACKGROUND OF THE INVENTION

The separation of an individual component from a mixture can be performed by adsorption separation. To perform the separation using an adsorption separation process in a continuous manner, the process utilizes a simulated moving bed (SMB). A simulated moving bed is a technology that connects the inlet flows, or feeds, and outlet flows, or extract and raffinate, to a series of adsorption beds in sequence. These beds may be considered to be portions of a single large bed whose movement is simulated. As the separation proceeds, the inlet flows and outlet flows are shifted from one bed to the next bed in the sequence. The moving bed simulation may be simply described as dividing the bed into a series of fixed beds and moving the points of introducing and withdrawing liquid streams from the series of beds instead of moving the beds past the inlet and outlet ports.

One method of accomplishing the change of position of the inlets and outlets is the use of a complex multi-port stopcock, or multi-port valve, having four or more inlet and outlet flow lines and which are connected to a plurality of other lines leading to specific points in the adsorption bed. One type of these multi-port valves is known as a "rotary valve."

Rotary valves are known in the art, and are described in U.S. Pat. Nos. 3,040,777; 3,192,954; 3,422,848 and 4,632,149. Processes utilizing a rotary valve in a simulated moving bed adsorption process are described in U.S. Pat. Nos. 3,201,491 and 3,291,726.

The problem with the usual rotary valves is that the valves are designed for large scale processing and are large and expensive. There is room for improvement in producing a small scale rotary valve.

SUMMARY OF THE INVENTION

The present invention is a rotary valve assembly for use in an adsorption separation system. The assembly comprises a first rotary plate having a surface for contact with a stationary plate, an inlet port and outlet port in fluid communication with each adsorbent bed inlet and outlet ports, and a plurality of secondary ports equal to the number of inlet and outlet ports; and a second rotary plate where the second rotary plate defines a plurality of channels and where each channel creates fluid communication between one secondary port and one of either the inlet port and outlet port of the first plate. The first rotary plate and second rotary plate form a rotary plate stack, where the ports extend through the plates, and the channels are bounded to form conduits within the stack. The assembly further comprises a first stationary plate having a plurality of ports with each port in fluid communication with one of an adsorbent bed inlet port, adsorbent bed outlet port, and a net flow port; a second stationary plate having a plurality of ports corresponding to each port on the first stationary plate, and a plurality of channels defined within the second plate equal to one less than the number of adsorbent beds; and a third stationary plate having a plurality of ports corresponding to the number of ports on the first rotary plate. The first stationary plate, second stationary plate and third stationary plate form a stationary plate stack, where the ports extend through the plates, and the channels are bounded to form conduits within the stack. The rotary plate stack rotates against the stationary plate stack and creates a series of simultaneous interconnections to permit the flow of fluid through a series of adsorption beds. The invention is a stack of plates that forms a compact and inexpensive rotary valve for use in small scale applications of adsorption separation.

In one embodiment, the rotary valve is an assembly of plates, wherein the plates are chemically etched, stamped, or machined to provide channels and ports. The ports and channels create an interconnection of conduits for creating the continuous flow paths directing fluids to and from a series of adsorbent beds. The ports also provide for attachment to external lines allowing for the addition of fluids and drawoff of product streams.

Other objects, advantages and applications of the present invention will become apparent to those skilled in the art from the following detailed description and drawings.

DETAILED DESCRIPTION OF THE INVENTION

The present invention comprises a rotary valve for use in an adsorption separation process. The rotary valve is used in an adsorption separation process where individual components from a mixture are separated through selective adsorption and it is necessary to connect at least one feed stream to a series of beds in sequence. This process is a simulated moving bed process and is described in U.S. Pat. No. 2,985,589 (Broughton et al.), which is incorporated by reference in its entirety. These beds may be individual beds, or portions of a single large bed. In the simulated moving bed process, when the feed stream inlet is shifted from one bed to the next, it is necessary to change the origin and destination of at least three additional streams. The additional streams to be shifted are a desorbent stream (an inlet), an extract stream (an outlet), and a raffinate stream (an outlet). The origins and destinations are the entry points and drawoff points for the streams from the beds.

Selective adsorption separation has become important for numerous small scale operations and reducing the expense associated with the equipment can enable the economical production of specialty chemicals.

Figure 1:
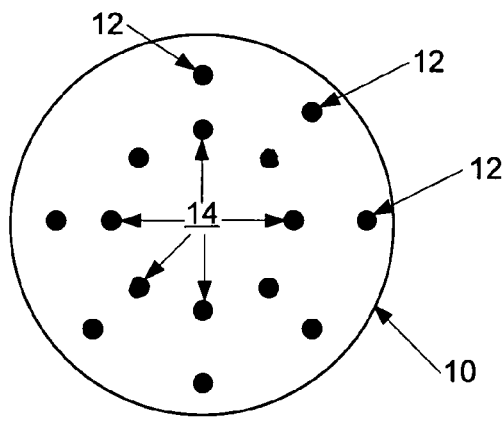
FIG. 1 is a first rotary plate of the rotary valve assembly for use with a four adsorbent bed system.

A low cost rotary valve design is an assembly comprising a stack of plates and enables inexpensive production of a small rotary valve. The rotary valve assembly comprises a stack of rotary plates that interface with a stack of stationary plates. The valve is demonstrated in one embodiment with four adsorbent beds. The stack of rotary plates includes a first plate 10, or interface plate, as shown in FIG. 1, which has a smooth surface for providing a sealing contact with a matching stationary surface. The first plate 10 includes a plurality of primary ports 12, where the number of primary ports is equal to the number of fluid connections, or conduits, leading to and from adsorption beds, or the number of inlet and outlet ports for the adsorption beds. The first plate 10 further includes a plurality of secondary ports 14, where the number of secondary ports 14 is equal to the number of primary ports 12. The ports 12, 14 extend through the first plate 10 to a second side opposite the smooth surface.

Figure 2:
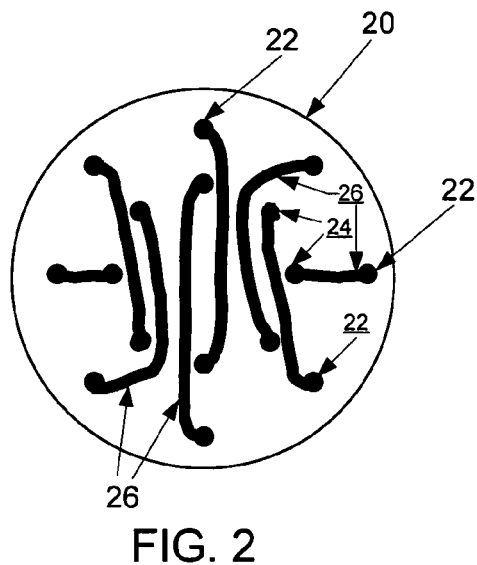
FIG. 2 is a second rotary plate of the rotary valve assembly.

The stack of rotary plates includes a second plate 20, or channel plate, as shown in FIG. 2. The second plate 20 has a first side that matches the second side of the first plate 10. The second plate 20 has a plurality of channels 26 defined within the second plate 20, with each channel 26 having a first end 22 and a second end 24. The channels 26 are formed through any method for producing grooves. Possible methods include, for example, chemical etching methods and other well known methods for micro-machining. In addition, depending on the materials of manufacture for the plates, the plates can be formed in molds where the channels 26 are defined in the mold. This is especially true for plastic materials. When the first plate 10 and the second plate 20 are stacked, the first end 22 of each channel 26 is aligned with a primary port 12 providing fluid communication between the first end 22 and the primary port 12. Also, the second end 24 of each channel 26 is aligned with a secondary port 14 providing fluid communication between the second end 24 and the secondary port 14. In addition, no channel 26 intersects another channel 26. In this embodiment, the primary ports 12 are arrayed around an axis of rotation at a constant distance from the axis of rotation, and the secondary ports 14 are arrayed around the axis of rotation at a second constant distance from the axis of rotation.

Alternate designs for the rotating plates include forming the second plate 20 with channels 26 that extend all the way through the plate 20. In this alternate design, a third plate (not shown) seats against the second plate 20 on the side opposite the side that interfaces with the first plate 10. In another alternative, the second plate 20 has ports extending though the plate 20 at the channel ends 22, 24, and the channels are on the side of the plate away from the first plate 10, and a third plate (not shown) covers the channels 26 to form enclosed conduits.

Figure 3A:
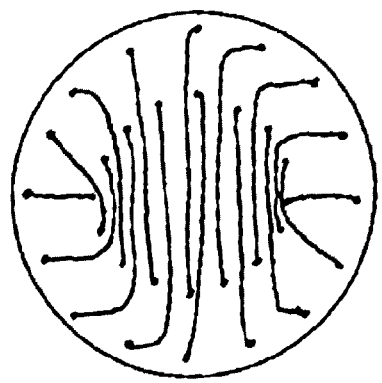
FIGS. 3a, 3b, 3c are the channel patterns for the second rotary plate for an 8 adsorbent bed system, a 12 adsorbent bed system and a 16 adsorbent bed system respectively.
Figure 3B:
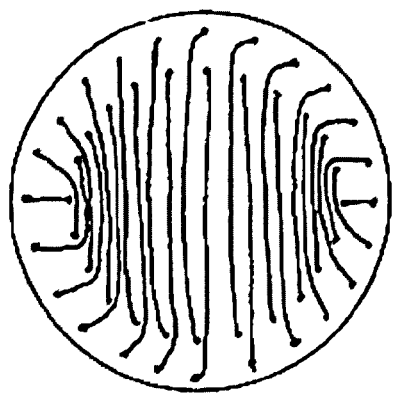
Figure 3C:
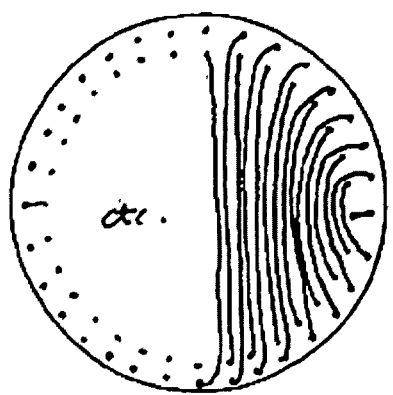

This rotary valve design is expandable to any number of adsorption beds, and the channel pattern for the second rotating plate 20 is shown for 8, 12, and 16 bed systems in FIGS. 3a to 3c.

Figure 4:
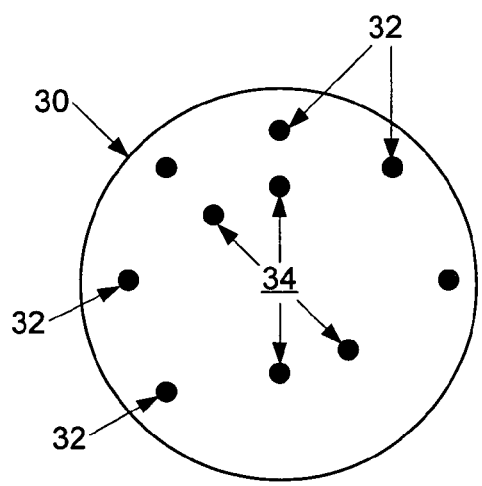
FIG. 4 is a first stationary plate of the rotary valve assembly for use with a four adsorbent bed system.

The rotary valve assembly further comprises a stack of stationary plates. The stack of stationary plates includes a first stationary plate 30, as shown in FIG. 4. The first stationary plate 30, or connection plate, includes a plurality of adsorbent bed ports 32 wherein each port 32 is in fluid communication with an inlet or an outlet to an adsorbent bed, therefore the number of adsorbent bed ports is two times the number of adsorbent beds. The first stationary plate 30 further includes a plurality of net flow ports 34. The number of net flow ports 34 is equal to the number of inlet flow lines to the system and outlet flow lines from the system. In the present embodiment, there are two inlets, a desorbent inflow and a feedstream, and two outlets, an extract outflow and a raffinate outflow, for a total of four net flow ports 34. The ports 32, 34 extend through the first stationary plate 30, where a first side of the plate 30 provides for fluid communication to the adsorbent beds and the net flow lines, and a second side for a sealing contact with a second stationary plate 40.

Figure 5:
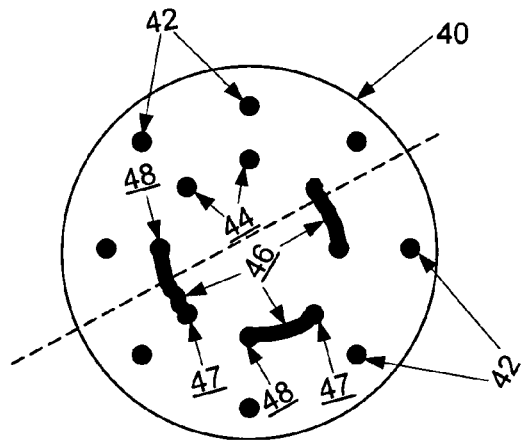
FIG. 5 is a second stationary plate of the rotary valve assembly for use with a four adsorbent bed system.

The second stationary plate 40, or channel plate, is shown in FIG. 5 and has a plurality of primary ports 42 that extend through the plate 40. The primary ports 42 are in fluid communication with the adsorbent bed ports 32 of the first stationary plate 30. The second stationary plate 40 includes at least two ports 44 in fluid communication with two of the net flow ports 34 of the first stationary plate 30 and extend through the plate 40, and a first side for a sealing contact with the first stationary plate 30. The second stationary plate 40 defines at least two channels 46 in the plate 40, wherein the channels 46 each have a first end 47 and a second end 48, and wherein at least one of the channels is in fluid communication with a net flow port 34 of the first stationary plate 30. The channels 46 are formed with any method for producing grooves and may extend through the thickness of the second stationary plate 40. When the channels 46 do not extend through the second stationary plate 40, at least one of the channels 46 must have a port that extends through the plate 40 to provide fluid communication with at least one of the net flow ports 34 of the first stationary plate 30. The second stationary plate 40 also has a second side opposite the first side for a sealing contact with a third stationary plate 50, or contact plate for the stationary plate assembly.

Figure 6:
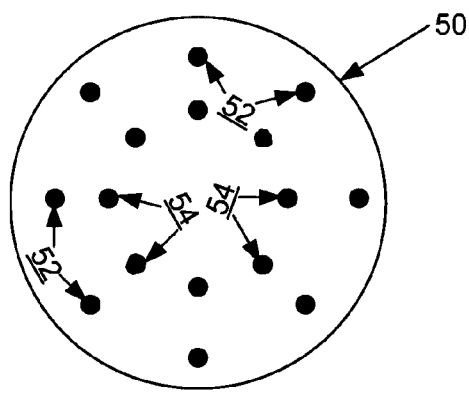
FIG. 6 is a third stationary plate of the rotary valve assembly for use with a four adsorbent bed system.

The third stationary plate 50 is shown in FIG. 6 and has a plurality of primary ports 52 that extend through the plate 50, and has a first surface that forms a sealing contact with the second stationary plate 40. The primary ports 52 are in fluid communication with the primary ports 42 of the second stationary plate 40, and the number of primary ports is equal to the number of adsorbent bed ports 32. The third stationary plate 50 further includes a plurality of secondary ports 54 that extend through the plate 50, and the number of secondary ports 54 is equal to the number of primary ports 52. The third stationary plate 50 is positioned against the second stationary plate 40 such that the primary ports 52 are in fluid communication with the primary ports 42 of the second stationary plate 40. In addition, the secondary ports 54 are positioned such that each of the channels 46 provide fluid communication between a pair of secondary ports 54, and that two of the secondary ports are in fluid communication with the two ports 44 in the second stationary plate 40. The ports 52, 54 are arrayed around the axis of rotation around which the rotary plate stack turns, and are disposed in a manner to periodically be in fluid communication with the ports 12, 14 of the first rotary plate 10.

The five plates are stacked in the order 20, 10, 50, 40, and 30. The rotating plates 10, 20 can be permanently held together, or held together by means that enables disassembly. The stationary plates 30, 40, 50 can be permanently held together, or held together by means that enables disassembly also. The rotating plate stack and the stationary plate stack are held together by means that provides a seal and allows the rotating plate stack to move against the surface of the third stationary plate 50. In general, the first rotary plate 10 and the third stationary plate 50 are much thinner than the other plates 20, 30, 40.

An alternate embodiment of the stationary plate stack is made of only the first stationary plate 30 and the third stationary plate 50 with the channels 46 defined either in the first stationary plate 30 in the surface facing the third stationary plate, or in the third stationary plate 50 in the surface facing the first stationary plate 30. In this embodiment the first stationary plate 30 is the connection plate for making fluid connections to the adsorption beds, and the third stationary plate 50 is a contact plate for making the interface contact with the rotary plate assembly.

Although the above example is presented to serve as an exemplary example, and there are many variations that one skilled in the art would be able to design upon reading the description, it is intended that the invention covers the many variations of plate stacks of this invention.

The materials of construction can be any durable and rigid material, such as stainless steel or other corrosion resistant material. Alternatively, the materials of construction can be some durable and rigid material with an impermeable and corrosion resistant coating applied to the plates. The first rotary plate 10 and the third stationary plate 50 are preferably made of a lubricious polymeric material to provide a seal as well as allowing the first rotary plate 10 to slide against the third stationary plate 50. A preferred material is Teflon™, or other polyfluorinated polymeric material. In an alternative, either one or both of the surfaces of the first rotary plate 10 and the third stationary plate 50 that slide against each other can be coated with a lubricious polymeric material.

Figure 7:
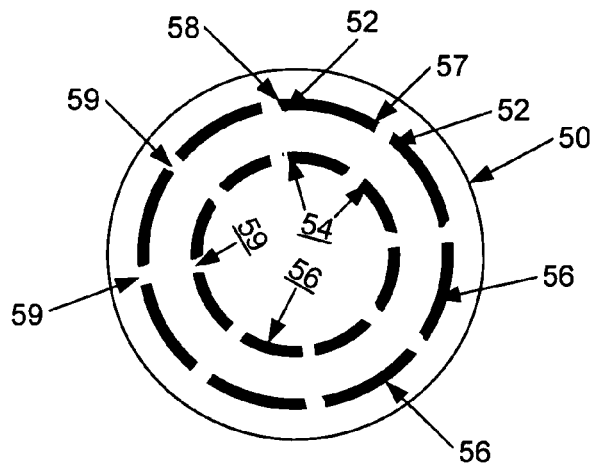
FIG. 7 is a smear plate design for use in the rotary valve assembly.

In one embodiment, the invention includes channels 56 in the third stationary plate 50. The channels 56 convert the third stationary plate 50 to a smear plate, as shown in FIG. 7. A smear plate extends the fluid communication during the rotation of the rotating plates 10, 20. The channels 56 extend from the third stationary plate ports 52, 54 along a path that will be followed by the ports 12, 14 of the rotating plates 10, 20. As the rotating plates 10, 20 move, the ports 12, 14 on the first rotating plate 10 establish fluid communication with the smear channels 56 as the ports 12, 14 pass over a first end 57 of the channels 56. Fluid flows through an inlet port 54, along a smear channel 56 and into a rotating plate port 14. Fluid also flows from a rotating plate port 12 into the smear channel 56 beginning at the first end 57, along the channel to the second end 58, and out the stationary plate port 52. During the rotation of the rotating plates 10, 20, fluid communication is maintained as the ports 12, 14 move along the channels 56, until the ports 12, 14 pass over the second end 58 of the channels 56. As rotation continues, there is a break in fluid communication for the short interval that the ports 12, 14 pass over a gap 59 between the channels 56. The gap 59 is sized to be at least the diameter of the ports 12, 14. After passing over the gap 59, fluid communication is reestablished and the sequence is advanced. The channels 56 are in fluid communication with the ports 52, 54 at the second end 58 of the channels 56, and the channels 56 are purged of residual fluid from the prior sequence to minimize backmixing. In an alternate embodiment, the smear channels 56 are on the first rotary plate 10 of the rotary plate stack.

Figure 8:
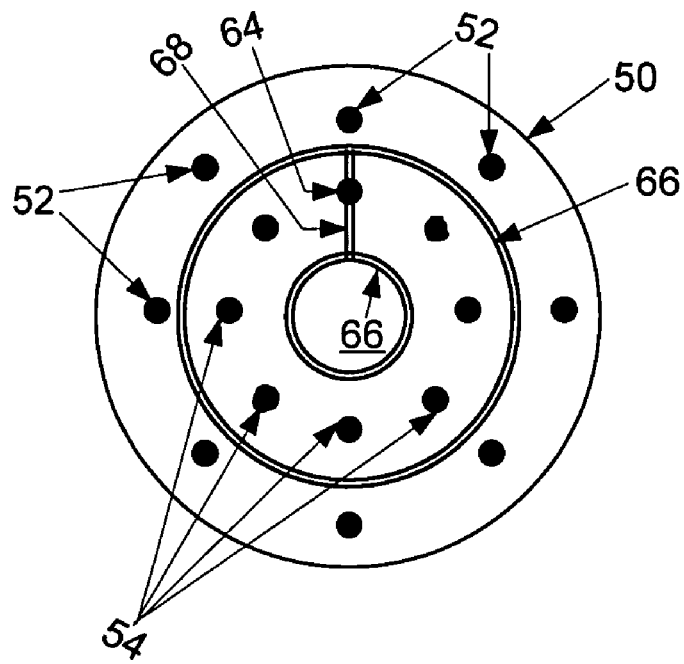
FIG. 8 is a design of the third stationary plate with lubrication grooves.

In another embodiment, the invention includes lubrication grooves 66 defined in the third stationary plate 50, as shown in FIG. 8. The lubrication grooves 66 provide for access to an appropriate lubricant to reduce friction between the surface of rotating plate 10 and the surface of stationary plate 50. The grooves 66 are circular with the center at the axis of rotation for the rotating plates 10, 20, and the grooves 66 do not intersect any of the ports 52, 54 on the stationary plate 50, nor do any of the ports 12, 14 of the rotating plate 10 pass over the grooves. This limits that amount of lubricant that may enter the system. A preferred lubricant is the desorbent used in the separation process. Use of the desorbent as a lubricant prevents cross-contamination between the ports of the valve. When the desorbent is the lubricant, a groove 68 is provided for fluid communication between the lubrication grooves 66 and the desorbent inlet 64. The desorbent inlet 64 is also one of the secondary ports 54 of the third stationary plate 50 and is the high pressure point of the system. This provides for positive pressure on the lubrication system and prevents other streams in the system from cross-contamination. Optionally, a separate port for lubricant can be added to the valve when it is desired to use a lubricant other than the desorbent. This separate port would have no fluid communication with the rest of the adsorption separation system.

Figure 9:
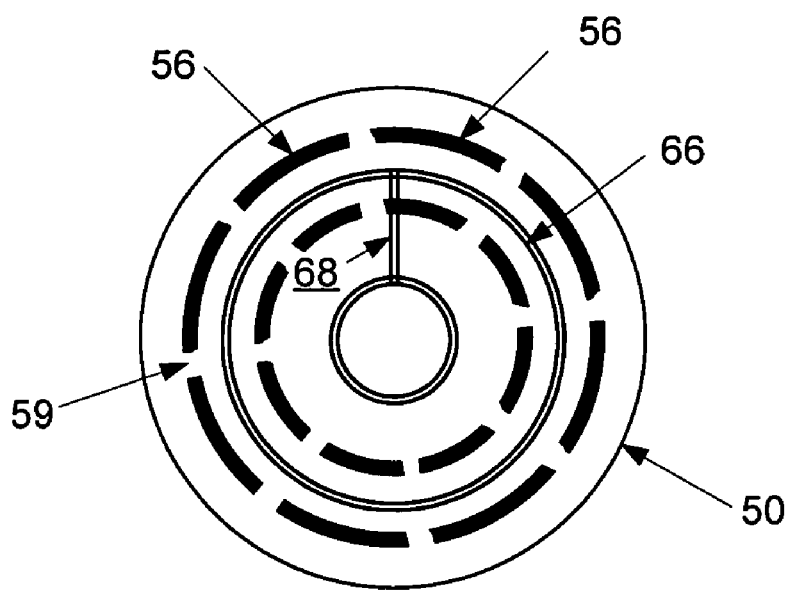
FIG. 9 is a design of the third stationary plate with lubrication grooves and smear channels.

Another embodiment of the invention incorporates the prior two embodiments and is shown in FIG. 9. In this embodiment, the third stationary plate 50 of the rotary valve incorporates lubrication grooves 66 and smear channels 56. The grooves 66 and channels 56 are as described above.

While the invention has been described with what are presently considered the preferred embodiments, it is to be understood that the invention is not limited to the disclosed embodiments, but it is intended to cover various modifications of the plates, combinations of plates, and equivalent arrangements included within the scope of the appended claims.

What is claimed is:

1. A rotary valve assembly for use in an apparatus for adsorption separation with multiple adsorption units and net flow lines comprising:

a first rotary plate having a first smooth surface for a sealing contact with a matching stationary surface, a second surface opposite the first surface, an inlet port for fluid communication with each adsorption unit inlet, an outlet port for fluid communication with each adsorption unit outlet, and a plurality of secondary ports equal to the number of adsorption unit inlets and outlets, where the ports extend through the first rotary plate;

a second rotary plate having a first surface for a sealing contact with the second surface of the first rotary plate, a second surface opposite the first surface, and defining a plurality of channels where each channel creates fluid communication between a secondary port of the first rotary plate and a port selected from the inlet ports and the outlet ports of the first rotary plate;

a first stationary plate having a first surface, a port for each adsorption unit inlet, a port for each adsorption unit outlet, and a port for each net flow line, where the ports extend through the first stationary plate;

a second stationary plate having a first surface for a sealing contact with the first surface of the first stationary plate, a second surface opposite the first surface, a port in fluid communication with each adsorption unit inlet, a port in fluid communication with each adsorption unit outlet, a port in fluid communication with one net flow inlet, a port in fluid communication with one net flow outlet, and the second stationary plate defining a plurality of channels equal to one less than the number of adsorption units, where the ports extend through the second stationary plate; and a third stationary plate having a first surface for a sealing contact with the second surface of the second stationary plate, a second surface opposite the first surface and having a smooth face providing the matching stationary surface in contact with the first surface of the first rotary plate, a port in fluid communication with each adsorption unit inlet, a port in fluid communication with each adsorption unit outlet, and a plurality of secondary ports in fluid communication with the secondary ports of the first rotary plate.

2. The rotary valve assembly of claim 1 wherein the second rotary plate is comprised of two plates with the first plate having a first surface for a sealing contact with the second surface of the first rotary plate, a second surface opposite the first surface, and defining a plurality of channels where each channel creates fluid communication between a secondary port of the first rotary plate and a port selected from the an inlet ports and the outlet ports of the first rotary plate, and a second plate having a first surface for a sealing contact with the second surface of the first plate and providing a cover for the plurality of channels defined in the first plate.

3. The rotary valve assembly of claim 1 wherein the first rotary plate sealing surface is coated with a lubricious polymeric material.

4. The rotary valve assembly of claim 1 wherein the third stationary plate matching surface is coated with a lubricious polymeric material.

5. The rotary valve assembly of claim 1 wherein the third stationary plate has lubrication channels defined in the matching surface.

6. The rotary valve assembly of claim 1 wherein the first rotary plate has lubrication channels defined in the sealing surface.

7. The rotary valve assembly of claim 1 wherein the first rotary plate has smear channels defined in the sealing surface.

8. The rotary valve assembly of claim 1 wherein the third stationary plate has smear channels defined in the matching surface.

9. A rotary valve assembly for use with a multiunit adsorption separation device with each unit having an inlet and an outlet, comprising:

a stationary plate assembly having a plate with a smooth seating surface, and an inlet port in fluid communication with each adsorption unit inlet, an outlet port in fluid communication with each adsorption unit outlet, a netflow port in fluid communication with each net flow line, a plurality of secondary ports equal to the number of adsorption unit inlet ports and adsorption unit outlet ports, and a number of conduits equal to one less than the number of adsorption units for connecting pairs of secondary ports; and a rotary plate assembly having a smooth sealing surface for a sealing contact with the stationary plate seating surface, a plurality of primary ports having a one to one correspondence with the stationary plate inlet ports and stationary plate outlet ports, a plurality of secondary ports equal to the number of primary ports, and a plurality of conduits for connecting each primary port with a secondary port.

10. The rotary valve assembly of claim 9 wherein the stationary plate assembly comprises:

a connection plate having an inlet port in fluid communication with each adsorption unit inlet, an outlet port in fluid communication with each adsorption unit outlet, and a port in fluid communication with each net flow line, where each port extends through the connection plate; and a contact plate having a first side contacting the connection plate, a second side having a smooth seating surface, a plurality of primary ports with each primary port in fluid communication with either a connection plate inlet port or outlet port, a plurality of secondary ports equal in number to the primary ports, and a plurality of channels defined on the first side of the contact plate, equal to one less than the number of adsorption units and forming fluid connections between pairs of secondary ports, and with two secondary ports in fluid communication with net flow lines, where the ports extend through the contact plate.

11. The rotary valve assembly of claim 9 wherein the stationary plate assembly comprises:

a contact plate having a first surface, a second surface opposite the first surface, an inlet port in fluid communication with each adsorption unit inlet, an outlet port in fluid communication with each adsorption unit outlet, and a port in fluid communication with each net flow line, wherein each port extends through the contact plate;

a channel plate having a first surface in sealing contact with the contact plate second surface, a second surface, a primary port in fluid communication with each contact plate inlet port and outlet port, a plurality of secondary flow ports equal to the number of inlet ports and outlet ports where at least two of the secondary flow ports are net flow ports with each net flow port in fluid communication with each contact plate net flow port, and a plurality of channels equal to one less than the number of adsorption units and defined in the channel plate, where each channel connects two secondary ports, and where each port extends though the channel plate; and a contact plate having a first surface in sealing contact with the channel plate second surface, a second surface having a smooth seating surface, a plurality of primary ports in fluid communication with the channel plate primary ports, and a plurality of secondary ports in fluid communication with the channel plate secondary ports.

12. The rotary valve assembly of claim 9 wherein the rotary plate assembly comprises:

an interface plate having a smooth sealing surface for a sealing contact with the stationary plate seating surface, a second surface opposite the sealing surface, a plurality of primary ports having a one to one correspondence with the stationary plate inlet ports and stationary outlet ports, and a plurality of secondary ports equal to the number of primary ports; and a channel plate having a first side for a sealing contact with the interface plate second side, and defining a plurality of channels in the channel plate where each channel provides fluid communication between a primary port and a secondary port.

13. The rotary valve assembly of claim 9 wherein the rotary plate assembly comprises:

an interface plate having a smooth sealing surface for a sealing contact with the stationary plate seating surface, a second surface opposite the sealing surface, a plurality of primary ports having a one to one correspondence with the stationary plate inlet ports and stationary outlet ports, and a plurality of secondary ports equal to the number of primary ports;

a channel plate having a first side for a sealing contact with the interface plate second side and a second side opposite the first side, and defining a plurality of channels in the channel plate where each channel provides fluid communication between a primary port and a secondary port; and a sealing plate having a first side for a sealing contact with the channel plate second side.

14. The rotary valve assembly of claim 9 wherein the stationary plate has lubrication channels defined in the seating surface.

15. The rotary valve assembly of claim 9 wherein the rotary plate has lubrication channels defined in the sealing surface.

16. The rotary valve assembly of claim 9 wherein the stationary plate is coated with a lubricious polymeric material.

17. The rotary valve assembly of claim 9 wherein the rotary plate is coated with a lubricious polymeric material.

18. The rotary valve assembly of claim 9 wherein the stationary plate has smear channels defined in the seating surface.

19. The rotary valve assembly of claim 9 wherein the rotary plate has smear channels defined in the sealing surface.

20. The rotary valve of claim 18 wherein the smear channels have an offset portion of the channel.

* * * * *